Jan. 14, 1969    TANEHIKO OKA ET AL    3,421,639
BULK CARRIER

Filed Nov. 17, 1966    Sheet 1 of 2

INVENTORS
TANEHIKO OKA
IKUO MIKI
TAKAO KAWAHARA
BY
McGlew and Toren
ATTORNEYS

Jan. 14, 1969    TANEHIKO OKA ET AL    3,421,639
BULK CARRIER

Filed Nov. 17, 1966    Sheet 2 of 2

INVENTORS
TANEHIKO OKA
IKUO MIKI
BY TAKAO KAWAHARA
ATTORNEYS 3,421,639
BULK CARRIER
Tanehiko Oka, Ikuo Miki, and Takao Kawahara, Nagasaki-shi, Japan, assignors to Mitsubishi Jukogyo Kabushiki Kaisha, Tokyo, Japan
Filed Nov. 17, 1966, Ser. No. 595,088
U.S. Cl. 214—15                                7 Claims
Int. Cl. B63b 27/24; B65g 53/30

ABSTRACT OF THE DISCLOSURE

The disclosure relates to waterborne carriers of bulk cargo of the pulverulent or granular type and including a piping system through which a fluid medium is circulated to discharge the cargo from the holds of the vessel. The disclosure is particularly directed to improved means for moving the cargo from the holds into the piping system for discharge to a shore-based storage area and to improved means, operatively associated with the cargo discharge means, for ballasting the empty holds and for discharging ballast from the holds.

Background of the invention

Conventional carriers of bulk cargo such as grain or dust ores, coal, salt, etc., are constructed with double bottoms, as is well known to those skilled in the art, since the center of gravity of the carrier would be too low in the loaded condition, and furthermore otherwise, the bottom shell of the ship would be damaged easily due to the impact of falling cargo discharged from a crane bucket or the like during loading. Conversely, during unloading, the cargo is discharged through cargo hatchways by means of bucket cranes or the like provided at a quay or pier where such carrier is moored, and the unloaded cargo is conveyed from the quay or pier to a storage yard or the like, usually by means of a belt conveyor. In order to obtain an unhindered passage of the crane bucket through the cargo hatchway, the hatchways on the upper deck, are designed so as to have lateral dimensions approximately the same as those of the bottom of a hold.

In view of these relatively large hatchway openings in the upper desk of the carrier, extra thick steel plates have to be used for the upper desk in order to provide sufficient strength, longitudinally of the carrier, to resist the strains and stresses due to hogging and sagging of the carrier. Furthermore, the upper plates of the double bottom must be made extra strong and thick in order to resist adequately impacts due to striking of the crane buckets on the top shell.

In addition, recently constructed carrier have a much higher tonnage and a much greater length, and this has required that the mooring quays be not only lengthened, but also that the anchorages or water adjacent the same be dredged to a deeper depth. In order to make most efficient use of these newer large carriers, the unloading equipment on the quays must be correspondingly greatly enlarged and must be provided with a more complicated mechanism. Thus, the size and the additional complications greatly increase the cost of the equipment.

Furthermore, during unloading, the cargo handling in a hold usually relies upon manpower rather than mechanical power, and in some cases bulldozers are used for such handling. On the other hand, much labor is needed for operating derrick booms as well as various equipments on the shoreside, and this has required that the mooring period be elongated. Due to this fact, the most efficient use of the carrier is not obtained, and the cost of the waterborne transportation becomes higher.

Summary of the invention

The invention relates to a bulk carrier provided with means for hydraulically conveying bulk cargo.

An object of the present invention is to provide a useful carrier of bulk cargo characterized by the lack of the disadvantages to which reference has been made and by the provision of holds for receiving bulk cargo, a cargo piping system through which a conveying fluid medium is circulated between the ship and storage yard during unloading, and means for discharging bulk cargo received in holds to the cargo piping system, said conveying fluid medium being supplied from a source outside the carrier and circulated through the cargo piping system to convey bulk cargo during unloading. The bulk cargo carrier is further provided with means for spraying or sprinkling, in holds, the conveying fluid medium fed through the cargo piping system; at least one fluid medium storage means communicable with the cargo piping system; means for gathering bulk cargo at the bottoms of holds by injection of the fluid medium stored in the storage means; means for discharging the gathered bulk cargo, along with the conveying fluid medium entraining the cargo, to the cargo piping system; and a ballast piping system usable, together with the means for discharging cargo to the cargo piping system, for ballasting the holds and for discharging ballast therefrom.

Brief description of the drawing

For an understanding of the principles of the present invention, reference is made to the following description of a typical embodiment thereof as illustrated in the accompanying drawings, wherein.

Description of the preferred embodiment

Figure 1:
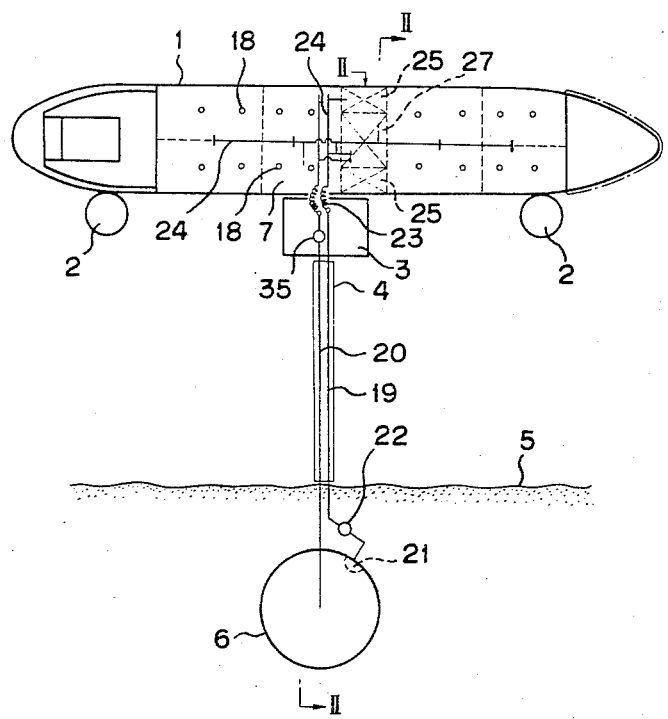
FIG. 1 is a plan view of a moored bulk cargo carrier, from which bulk cargo is unloaded.
Figure 2:
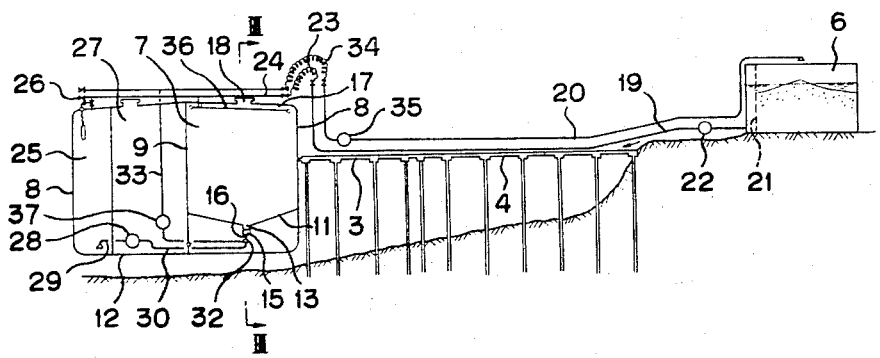
FIG. 2 is a vertical sectional view taken along the line II—II of FIG. 1.
Figure 3:
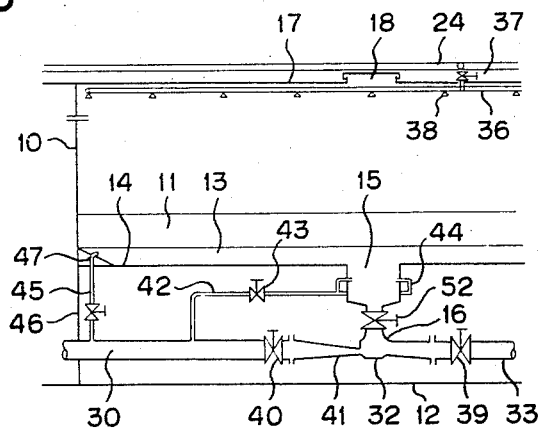
FIG. 3 is a detailed sectional view taken along the line III—III of FIG. 2.
Figure 4:
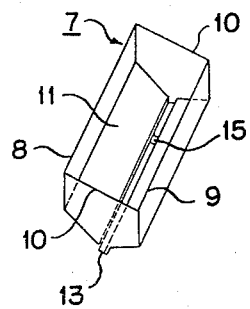
FIG. 4 is a perspective view of a hold shown in FIGS. 2 and 3.
Figure 5:
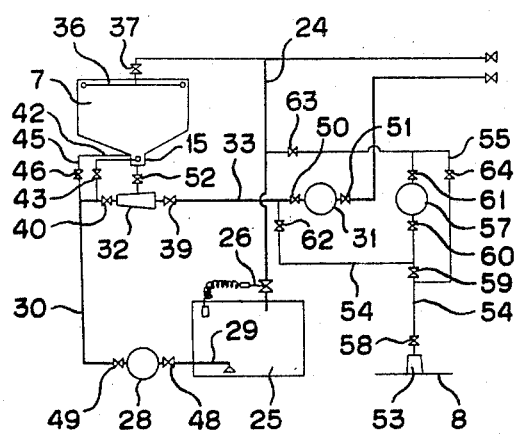
FIG. 5 is a schematic diagram illustrating the piping systems in the bulk cargo carrier shown in FIGS. 1–4.

Referring to the drawings, a bulk cargo carrier 1 is moored at dolphins 2. The cargo transportation equipments of the carrier are supported by berth 3. A pipe and walkway 4 is provided between the berth 3 and the shore 5. A bulk cargo reservoir tank 6 is located at some distance from the shore 5.

Bulk cargo holds 7 are formed by side shell 8, a centerline longitudinal bulkhead 9 and transverse bulkheads 10, symmetrically to the centerline of the carrier, so that each of the right-hand holds approximately corresponds with each of the left-hand ones. The hopper-shaped double bottom plating 11 of each hold 7 is separated from bottom shell 12 of the hull and is, centrally thereof, provided with a cargo receiving groove or channel 13 extending in the longitudinal direction. The bottoms 14 of the cargo receiving grooves or channels 13 are provided with receiving sinks 15, and each sink communicates with a cargo feeding pipe 16. A plurality of cargo hatchways 18 are provided in spaced relation along the upper deck 17 covering the holds 7 and are used during loading of bulk cargo into the holds 7.

A medium supply pipe 19, through which a conveying fluid medium is supplied to the carrier 1, is, at one end, connected with the reservoir tank 6 through a filter 21 and is, at the other end, connected with one end of a medium feed pipe 24 on the carrier 1 through a suitable flexible coupling 23. A cargo unloading pipe 20, through which bulk cargo is carried in the fluid medium, is, at one end, connected with the reservoir tank 6. The medium supply pipe 19 is provided with a medium supply pump 22.

At the other end of the medium feed pipe 24, which is communicable with a medium collecting tank 25 located inside the carrier 1, there is provided a level-adjusting valve 26, which serves to automatically adjust the level of the conveying fluid medium in the medium collecting tank 25. A pump room 27 adjacent the medium collecting tank 25 is provided with a medium charging pump 28 for feeding the fluid medium to holds. A medium suction pipe 29 of the medium charging pump 28 is connected with the medium collecting tank 25, while a medium delivery pipe 30 of the medium charging pump 28 is connected with each hold 7 through both an eductor 32 and the cargo feeding pipe 16.

The eductor 32 is connected with the cargo feeding pipe 16. The pump room 27 is also provided with a cargo discharge pump 31. A discharge pipe line 33 extends from the eductor 32 to the cargo unloading pipe 20 through both the cargo discharge pump 31 and a suitable flexible coupling 34. A booster pump 35 is provided in the cargo unloading pipe 20 to intensify the pressure of the conveying fluid medium, which thus is returned to the reservoir tank 6.

A fluid medium sprinkling pipe 36 is positioned up on the walls of each hold 7 and is connected with the medium feed pipe 24 through a valve 37. The sprinkling pipe 36 is provided with a plurality of sprinkling nozzles 38, through which the fluid medium is sprinkled or sprayed. A valve 40 is located in the inlet side of the eductor 32 or in the medium delivery pipe 30, while a valve 39 is located on the delivery side of the eductor or in the discharge pipe 33. An eductor nozzle 41 communicable with the eductor 32 is positioned directly behind the valve 40. A fluid medium injection pipe 42 is, at one end, connected with the medium delivery pipe 30, upstream of the valve 40, through a valve 43, and, at the other end, communicates with the receiving sink 15 through injection nozzle 44. A jet pipe 45 is, at one end, connected with the medium delivery pipe 30 through a valve 46, while, at the other end, it is provided with jet nozzle 47 communicable with the cargo receiving groove 13.

The medium charging pump 28 is provided with a valve 48 and a valve 49. The cargo discharge pump 31 is provided with a valve 50 and a valve 51. The cargo feeding pipe 16 is provided with a valve 52.

A sea-water pipe 54 is connected with a sea chest 53, which is mounted on the bottom shell 12 of the hull and which communicates with the sea water. A ballast delivery pipe 55 is connected between the sea-water pipe 54 and the medium feed pipe 24. A ballast drain pipe 56 is branched from the sea-water pipe 54 and is connected with the discharge pipe 33. A ballast pump 57 is connected between the ballast drain pipe 56 and the ballast delivery pipe 55.

A valve 58 is positioned above the sea chest 53, while a valve 59 is positioned, in the sea-water pipe 54, between one end of the ballast delivery pipe 55 and one end of the ballast drain pipe 56. The ballast pump 57 is provided with a valve 60 and a valve 61. The ballast drain pipe 56 is provided with a valve 62, while the ballast delivery pipe 55 is, near its junction with the medium feed pipe 24, provided with a valve 62 and is, near its junction with the sea-water pipe 54, provided with a valve 64. The junction at which the delivery pipe of the ballast pump 57 communicates with the ballast delivery pipe 55 is positioned between the valves 63, 64.

Next, the operations will be explained.

The carrier 1 is loaded, for instance in a port of call, with bulk cargo through the cargo hatchways 18 on upper deck 17 and is, after sailing from the port of call, moored at dolphins 2 and, at the same time, alongside berth 3.

In order to connect the carrier 1 with the reservoir tank 6 on the shoreside, the medium supply pipe 19, the medium supply pump 22, the cargo unloading pipe 20, the booster pump 35, etc., are properly arranged on the carrier 1, berth 3 and the pipe and walkway 4.

When the medium supply pump 22 is driven, the conveying fluid medium stored beforehand in the reservoir tank 6 is fed to the medium collecting tank 25 through a series of feeding means including the medium supply pipe 19, the flexible coupling 23, the medium feed pipe 24 and the level-adjusting valve 26. On the other hand, both the valve 37 on the medium feed pipe 24 and the valve 48 of the medium charging pump 28 are closed.

When the medium collecting tank 25 is filled with the conveying fluid medium, the valve 48 and the valve 49 of the medium charging pump 28 are opened. At the same time, the valve 39 and the valve 40 on the discharge pipe 33 are opened. In addition, the valve 50 and the valve 51 of the cargo discharge pump 31 are opened. Thus, the conveying fluid medium in the medium collecting tank 25 is returned to the reservoir tank 6 on the shoreside through a series of discharge means including the discharge pump 31, the discharge pipe 33, the booster pump 35 and the cargo unloading pipe 20, provided that the medium charging pump 28, the cargo discharge pump 31 and the booster pump 35 are driven.

The conveying fluid medium thus is circulated through both feeding means and discharge means stated above. On the other hand, the valve 43, the valve 46 and the valve 52 are closed; a constant level of the conveying fluid medium in the medium collecting tank 25 is kept by means of the level-adjusting valve 26.

The valve 43 is then opened. Thereby, a portion of the conveying fluid medium passing through the delivery pipe 30 is injected into the receiving sink 15 through the injection pipe 42. When the bottom plating 11 of each hold 7 is filled with the conveying fluid medium, a part of the cargo received in each hold 7 is brought into contact with the fluid medium, being moved therein.

If, next, the valve 52 is opened, then the conveying fluid medium lying in the receiving sink 15 and also in the cargo receiving groove 13 flows down, together with the cargo therein, and through the valve 52 to the eductor 32, in which the conveying fluid medium and the cargo are struck by the fluid medium injected through the eductor nozzle 41. As a result, these substances are forced to the discharge pipe 33 and through the discharge pump 31 and the booster pump 35 to the cargo unloading pipe 20. Thus, the conveying fluid medium is returned to the reservoir tank 6.

The feeding of the conveying fluid medium just mentioned is continued until the unloading is finished. Said feeding is performed in order that the cargo may have fluidity and in order that the receiving sink 15 may be prevented from being clogged with cargo.

The conveying fluid medium which carries bulk cargo is returned to the reservoir tank 6, in which the cargo is separated, by means of the filter 21, from the conveying fluid medium. The fluid medium, from which bulk cargo has been separated, is fed again, for recirculation, through a series of feeding means mentioned above, to the medium collecting tank 25 inside the carrier 1.

Bulk cargo in each hold 7 continues to move naturally downward along the inclined surfaces of the bottom thereof to the cargo receiving groove 13, until a side surface of the piled cargo attains an angle of repose. If said angle is attained, then the natural movement of cargo comes to a stop. In order to prevent this, the valve 46 is opened, and the conveying fluid medium is injected through the jet pipe 45 into the cargo receiving groove 13. At the same time, the valve 37 is opened. Thus, the conveying fluid medium is sprinkled or sprayed on the cargo in each hold 7 through the fluid medium sprinkling pipe 36 arranged up on the walls of each hold.

Due to jetting and sprinkling of the conveying fluid medium, cargo is fluidized and is moved along the bottom surfaces of each hold 7 to gather in the cargo receiving groove 13. Cargo is then discharged through the series of discharge means already described and is carried in the conveying fluid medium to the reservoir tank 6.

The discharge of cargo from successive hold 7 is continued until all the cargo in each hold has been conveyed to the reservoir tank 6 on the shoreside. The unloading operation is thus finished.

The efficient cleaning of each hold 7, from which cargo has fully been discharged, can be achieved by circulating the conveying fluid medium for a prolonged time. Such circulation is repeated for a while after the complete discharge of cargo. For this purpose, the above-mentioned series of feeding means and also discharge means may be used, and the fluid medium is continuously fed and discharged through these means.

After the cleaning of the holds, the medium supply pump 22 is deactivated, and the supply of the conveying fluid medium is stopped. On the other hand, the conveying fluid medium still remaining in the medium collecting tank 25 as well as in each hold 7 is discharged. Thus, the cleaning operation is completely finished.

Needless to say, after the above-mentioned operations, the medium charging pump 28, the cargo discharge pump 31 and the booster pump 35 are brought to a standstill.

Next, in the case of ballasting the carrier 1, the feeding means already described may indeed be used, but other special means such as a ballast piping system may be used too. The ballast piping system comprises the sea chest 53, the ballast pump 57, the ballast delivery pipe 55 and the medium feed pipe 24. Each cargo hold 7 is ballasted through the sprinkling pipe 36, while the medium collecting tank 25 is ballasted through the valve 26. In ballasting, valves 43, 46 48 and 52 are closed. Conversely, in order to discharge the ballast, a discharge piping system is provided, which comprises the medium charging pump 28, the medium delivery pipe 30, the discharge pipe 33 and the discharge pump 31. Furthermore, valves 48, 49, 50, 51 and 52 are opened. Thereby, the ballast in each cargo hold 7 and that in the medium collecting tank 25 are discharged. If the cleanings of each hold 7 and also the medium collecting tank 25 are necessary, the above-mentioned ballasting and ballast-discharging operations are alternately repeated.

As will be clear from the foregoing description, with the arrangement of the invention the bulk carrier 1 is provided with a cargo unloading equipment containing the feeding means consisting of the tank, piping systems and pumps; the discharge means and the cargo reservoir tank being on the shoreside. It is therefore not necessary to provide large-sized equipments such as a shoreside unloader, a derrick boom, a belt conveyor, etc. In addition, the unloading of bulk cargo, inclusive of shifting the cargo in each hold, is performed by using the conveying fluid medium which is continuously fed for circulation, so that, on the one hand, personnel requisite for the unloading of cargo in the conventional bulk carrier is not necessary and, on the other hand, owing to continuous unloading, the unloading time is shortened. The result is that the rate of performance of the carrier is increased.

Furthermore, in the case of the bulk cargo carrier of the invention, the cargo hatchways are smaller in size than the conventional ones, so that thinner plates can be used for the upper deck without reducing the requisite strength of the hull, thereby reducing the construction cost of the hull. Because of smaller hatchways the broadside of the carrier has the form of a tanker and thus the load capacity is increased.

Furthermore, if bulk cargo is a substance soluble in the conveying fluid medium fed for circulation, then said fluid medium is saturated with the substance, and the saturated fluid medium may favorably be used for conveying the bulk cargo.

Finally, the cargo piping system of the carrier of the invention may be provided with the ballast piping system which is used, together with means for discharging cargo to the cargo piping system, for ballasting each hold and for discharging ballast therefrom. Consequently, it is not necessary to provide independent ballasting means, though the same has hitherto been used. It will thus be clear that the invention is very useful in all respects as mentioned.

It is to be understood that various modifications of the disclosed embodiment may be made without departing from the spirit and scope of the present invention as set forth in the appended claims.

What is claimed is:

1. A bulk cargo carrier for the waterborne transportation of bulk cargo, such as grain or dust ores, coal, salt and the like, comprising, in combination, plural separate cargo holds each having hopper bottom walls sloping downwardly and terminating at a channel extending across the hold; at least one receiving sink extending downwardly from each channel; a respective eductor having an inlet communicating with a lower discharge end of each sink; a respective nozzle discharging into each eductor; an upper deck covering said holds; a cargo conveying fluid supply line and a cargo conveying fluid return line extending along said upper deck and arranged for respective connection to a fresh water supply line and a fresh water return line communicating with a shore-based reservoir of fresh water arranged to receive cargo discharged from said carrier; fresh water tank means on said carrier connected to said supply line to receive fresh water from the shore-based reservoir; cargo discharge pipe means connecting said return pipe to the downstream ends of said eductors; pump means connected to said tank means to withdraw fresh water therefrom; and delivery pipe means connecting said pump means to said eductor nozzles to direct fresh water under pressure from said tank means through said eductors and train cargo in said sinks and force the cargo through said discharge pipe means into said return pipe, along with said fresh water, for delivery to the shore-based reservoir.

2. A bulk cargo carrier, as claimed in claim 1, including injection pipe means connected between said delivery pipe means, upstream of said eductor nozzles, and said sinks to discharge fresh water under pressure from said pump means into said sinks to loosen cargo in said sinks for flow into said eductors.

3. A bulk cargo carrier, as claimed in claim 1, including jet pipe means connected to said delivery pipe means, upstream of said eductor nozzles, and to said channels to direct fresh water under pressure, from said pump means, into said channels to move cargo in said channels into said sinks.

4. A bulk cargo carrier, as claimed in claim 1, including booster pump means connecting said discharge pipe means to said return pipe.

5. A bulk cargo carrier, as claimed in claim 1, including a level control valve connected to said tank means and to said supply line and controlling the level of fresh water in said tank means.

6. A bulk cargo carrier, as claimed in claim 1, including sprinkler means located in the upper portion of each hold above the cargo therein and connected to said supply line for discharge of fresh water, entering said supply line from the shore based reservoir, onto the cargo in said holds to assist discharge of cargo from said holds into said eductors.

7. A bulk cargo carrier, as claimed in claim 6, including a sea-water ballasting system connected to said holds and to said tank means; said ballasting system comprising a sea-water chest on the bottom of said carrier communicating with the sea water, a ballast pump connected to said sea-water chest and ballast pipe means connected between said ballast pump and said supply line whereby, upon operation of said ballast pump, sea water is pumped into said holds through said supply line and said sprinkler means, and into said tank means through said supply line; ballast being discharged from said holds and from said tank means by operation of said pump means to withdraw the ballast water from said tank means for discharge through said eductor nozzles and said eductors into said return pipe for discharge overboard of the carrier, the discharge through said eductors withdrawing the ballast from said holds.

References Cited

UNITED STATES PATENTS

| | | | |
|---|---|---|---|
| 1,127,137 | 2/1915 | West | 214—15 |
| 2,471,026 | 5/1949 | Eby | 114—74 XR |
| 3,305,106 | 2/1967 | Ishino | 214—14 |

GERALD M. FORLENZA, *Primary Examiner.*

FRANK E. WERNER, *Assistant Examiner.*

U.S. Cl. X.R.

302—14